(12) United States Patent
Cheng et al.

(10) Patent No.: US 8,259,066 B2
(45) Date of Patent: Sep. 4, 2012

(54) IMPACT FORCE FEEDBACK DEVICE AND INTERACTIVE SYSTEM USING THE SAME

(75) Inventors: Kuen-Chiuan Cheng, Kaohsiung (TW); Hung-Yueh Chen, Taichung County (TW); Po-Chang Chen, Taipei County (TW); Chi-Shen Chang, Hsinchu County (TW); Chin-Yuan Wang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 596 days.

(21) Appl. No.: 12/481,586

(22) Filed: Jun. 10, 2009

(65) Prior Publication Data

US 2010/0225586 A1 Sep. 9, 2010

(30) Foreign Application Priority Data

Mar. 9, 2009 (TW) ................................ 98107520 A

(51) Int. Cl.
  *G06F 3/033* (2006.01)
(52) U.S. Cl. ........................................ 345/163; 156/161
(58) Field of Classification Search .................. 345/156, 345/161, 163
  See application file for complete search history.

(56) References Cited

U.S. PATENT DOCUMENTS

| | | | |
|---|---|---|---|
| 6,211,775 B1 * | 4/2001 | Lee et al. ..................... | 340/407.1 |
| 6,693,622 B1 | 2/2004 | Shahoian et al. | |
| 7,084,854 B1 | 8/2006 | Moore et al. | |
| 7,182,691 B1 | 2/2007 | Schena | |
| 7,231,057 B2 * | 6/2007 | Kim et al. ...................... | 381/396 |
| 7,285,879 B2 * | 10/2007 | Osaka ........................ | 310/12.02 |
| 7,291,942 B2 * | 11/2007 | Osaka ........................ | 310/12.04 |
| 7,561,142 B2 * | 7/2009 | Shahoian et al. ............. | 345/156 |
| 7,868,490 B2 * | 1/2011 | Nagai et al. ................. | 310/12.19 |
| 2003/0127317 A1 * | 7/2003 | Cope et al. .................... | 204/164 |
| 2005/0140326 A1 * | 6/2005 | Houkes et al. ................ | 318/632 |

(Continued)

FOREIGN PATENT DOCUMENTS

TW 200518422 6/2005

(Continued)

OTHER PUBLICATIONS

"Office Action of Taiwan Counterpart Application", issued on Mar. 15, 2012, p. 1-p. 9, in which the listed references were cited.

*Primary Examiner* — Bipin Shalwala
*Assistant Examiner* — Afroza Chowdhury
(74) *Attorney, Agent, or Firm* — Jianq Chyun IP Office

(57) ABSTRACT

An impact force feedback device and an interactive system using the same are provided, wherein a large impact force feedback is generated to provide a real force feedback sensation to the user. The impact force feedback device includes a housing, a magnet, and at least one actuator assembly. The housing carries the actuator assembly. The actuator assembly includes a guide rod device, a mass, and a coil. The guide rod device is disposed on the housing. The mass is disposed on the guide rod device in a sliding manner. The coil generates an electric field when a current is conducted through it. An electromagnetic force is generated by supplying the current in a direction orthogonal to a magnetic field. The electromagnetic force is supplied to the mass such that the mass moves on the guide rod device and impacts the housing to generate the unidirectional impact force feedback.

28 Claims, 13 Drawing Sheets

U.S. PATENT DOCUMENTS

| | | | |
|---|---|---|---|
| 2006/0002578 A1* | 1/2006 | Kim et al. | 381/396 |
| 2006/0028312 A1* | 2/2006 | Chang et al. | 335/229 |
| 2006/0028929 A1* | 2/2006 | Osaka | 369/44.14 |
| 2006/0034599 A1* | 2/2006 | Osaka | 396/144 |
| 2008/0123348 A1* | 5/2008 | Chang et al. | 362/321 |
| 2009/0091194 A1* | 4/2009 | Nagai et al. | 310/12 |

FOREIGN PATENT DOCUMENTS

| | | |
|---|---|---|
| TW | I277114 | 3/2007 |
| TW | I287907 | 10/2007 |

* cited by examiner

Electromagnetically actuated
vibration flexible device

Force feedback mouse

Structure of internal actuator

Biaxial force feedback device

IMPACT FORCE FEEDBACK DEVICE AND INTERACTIVE SYSTEM USING THE SAME

CROSS-REFERENCE TO RELATED APPLICATION

This application claims the priority benefit of Taiwan application serial no. 98107520, filed on Mar. 9, 2009. The entirety of the above-mentioned patent application is hereby incorporated by reference herein and made a part of specification.

BACKGROUND

1. Technical Field

The present disclosure generally relates to a force feedback device, and more particularly, to a force feedback device for generating a unidirectional impact force feedback and an interactive system.

2. Description of Related Art

The consumers' demand to the technical qualities (for example, sound, light, and interactive effect, etc) of electronic products has been increasing drastically along with the rapid development of technologies in the 3C (computer, communication, and consumer electronics) industry. For many years, the development of electronic products has been focused on the accomplishment of audio reality and video fullness, while the related techniques for realizing touch reality have not advanced very much. Most contact devices are control devices. Namely, a user input an instruction into such a contact device by touching a switch or a sensor, and when the contact device receives the instruction, it performs a predetermined action. Contrarily, there are fewer force feedback devices.

A force feedback device generates reactive forces corresponding to a virtual object in a virtual environment by using an actuator, so as to simulate the sensation of touching and impacting a real object.

There are two major types of force feedback devices. One type of force feedback devices notify or alarm the user with single- or multi-phase vibration, and the other type of force feedback devices are dynamic (force feedback) joysticks. A dynamic joystick is usually fastened on a desktop or a platform for providing an interactive "tactile scenario" to the user. However, the monotonous vibration operation of the former and the low portability of the latter do not make these force feedback devices very satisfactory.

The interaction between players and games has been greatly improved when Nintendo released the video game console Wii in 2006. The interface of Wii is changed from the simple button interface into an emulational operation interface, and a feedback device is vibrated by detecting a handheld joystick with a wireless sensor, so as to bring a real interactive sensation to the player. However, this device still cannot provide a force feedback generated and received in a real action.

A vibrotactile haptic feedback device is disclosed in U.S. Pat. No. 6,693,622, wherein a vibration effect is achieved through oscillatory striking movements. Referring to FIG. 1A, a magnet 102 is disposed on a housing 104, and a coil 106 is wrapped around the magnet 102. The magnetic force generated by the magnet 102 is adjusted by controlling the current conducted through the coil 106, so that different forces are supplied to the magnet 110a and the magnet 110b on the pivoting member 108. A vibration is produced along the axis B by the pivot 112, and the vibration magnitude is increased by increasing the weight of the mass 114.

Referring to FIG. 1B, an electromagnetically actuated vibration system is also disclosed in U.S. Pat. No. 6,693,622. In this electromagnetically actuated vibration system, a compliant member 148 is connected to a pendulum magnet 146 to form a pendulum system, and an attractive force is produced to the pendulum magnet 146 by conducting a current through the coil 144, so as to change the pendulum stiffness. A coil 154 is wrapped around a steel core 152, and a magnetic force is generated by conducting a current through the coil 154. The magnetic force attracts the pendulum magnet 146 and causes the pendulum magnet 146 to move back and forth, so as to provide a vibrating force feedback sensation.

A force feedback device is disclosed in U.S. Pat. No. 7,084,854. According to an embodiment of the present disclosure, the force feedback device is a computer mouse, wherein a compliant spring leaf is adopted for accomplishing suspension and restoration. Referring to FIG. 2A, the mouse includes an actuator 210, a top cover 214, a base 212, and a printed circuit board (PCB) 216. When the mouse is used, the actuator 210 pushes the top cover 214 so that the user who grasps the mouse can feel a force from the top cover 214, so that a force feedback sensation is provided. FIG. 2B illustrates the structure of the actuator 210. As shown in FIG. 2B, in the actuator 210 the compliant member 220 is connected to the adapter ring 222, the adapter ring 222 is connected to the magnet 224, and a gap is formed between the coil 226 and the magnet 224. A current can be conducted through the coil 226 to move the actuator 210, so as to provide a tactile sensation to the user. According to another embodiment of the present disclosure, the force feedback device can be expanded into a 2-dimensional force feedback device (as the actuators 230 and 240 in FIG. 2C), and a desired directional oscillatory vibration is provided through a phase difference between biaxial input waveforms.

Another force feedback device is disclosed in U.S. Pat. No. 7,182,691, wherein a directional oscillatory vibration is provided through a centrifugal force. As shown in FIG. 3A, this force feedback device is applied to a game controller 300 which can provide a multi-directional force feedback to the user. The game controller 300 includes two grips 310, a direction pad 320, two joysticks 330, and a plurality of buttons 340. In the present disclosure, two rotating masses are adopted for generating an inertial force. The operation principle of the force feedback device is illustrated in FIG. 3B, wherein the two eccentric masses are respectively driven by a rotating actuator, and the rotation axes of the two eccentric masses are parallel to each other. The eccentric masses respectively generate an inertial force when they rotate at a constant velocity, and a harmonic vibration force is produced by integrating these two inertial forces. By changing the phase difference between the two eccentric masses, the direction of the harmonic vibration force can be changed, so that a force feedback in different directions can be provided to the user. As shown in FIG. 3B, forces in different directions are generated along with different phase differences.

In foregoing U.S. Pat. No. 6,693,622, the force feedback device provides an oscillatory vibration sensation by using an electromagnetic actuated vibration system. In foregoing U.S. Pat. Nos. 7,084,854 and 7,182,691, even though these force feedback devices can generate a directional vibration through the phase difference between biaxial waveforms, they can only provide an oscillatory vibration but not a more complicated force feedback scenario, and besides, because these force feedback devices are designed to generate symmetrical vibration force feedback, they have very limited route designs.

SUMMARY

Accordingly, the present disclosure is directed to an impact force feedback device which can generate a large impact force feedback, so as to provide a real force feedback sensation to the user.

In an embodiment of the present disclosure, an impact force feedback device including a housing, a magnet, and at least one actuator assembly is provided. The housing carries the actuator assembly. The magnet generates a magnetic field within the housing. The actuator assembly includes a guide rod device, a mass, and a coil. The guide rod device is disposed on the housing. The mass is disposed on the guide rod device in a sliding manner. The coil generates an electric field when a current is conducted through the coil. An electromagnetic force is generated by conducting the current through the coil in a direction orthogonal to the magnetic field, and the electromagnetic force is supplied to the mass such that the mass moves on the guide rod device and impacts the housing to generate an impact force feedback.

The impact force feedback device provided in an embodiment of the present disclosure is suitable for an interactive system. The interactive system includes a control unit and the impact force feedback device. The impact force feedback device includes a housing, a magnet, and at least one actuator assembly. The housing carries the actuator assembly. The actuator assembly includes a mass, a guide rod device, and a coil. The guide rod device is disposed on the housing. The mass is disposed on the guide rod device in a sliding manner. The control unit receives a start-up command and then conducts a current through the coil to generate an electric field. The control unit conducts the current through the coil in a direction orthogonal to a magnetic field to generate an electromagnetic force, and the control unit supplies the electromagnetic force to the mass so that the mass moves on the guide rod device and impacts the housing to generate an impact force feedback. The impact force feedback device provided in an embodiment of the present disclosure is suitable for an interactive system. Besides the impact force feedback device, the interactive system further includes a sensor, a force feedback control unit, and a driving circuit. The sensor senses a user input and outputs a sensing signal accordingly. The force feedback control unit receives the sensing signal and a virtual signal and generates a force feedback control signal accordingly. The driving circuit receives the force feedback control signal and drives the impact force feedback device to generate a feedback force corresponding to the user input.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIGS. 5A-5C are diagrams of an impact force feedback device according to another embodiment of the present disclosure, wherein FIG. 5A is a top view of the impact force feedback device, FIG. 5B is a cross-sectional view of the impact force feedback device along line I-I in FIG. 5A, and FIG. 5C is a cross-sectional view of the impact force feedback device from another angle.

DESCRIPTION OF THE EMBODIMENTS

Figure 1A:
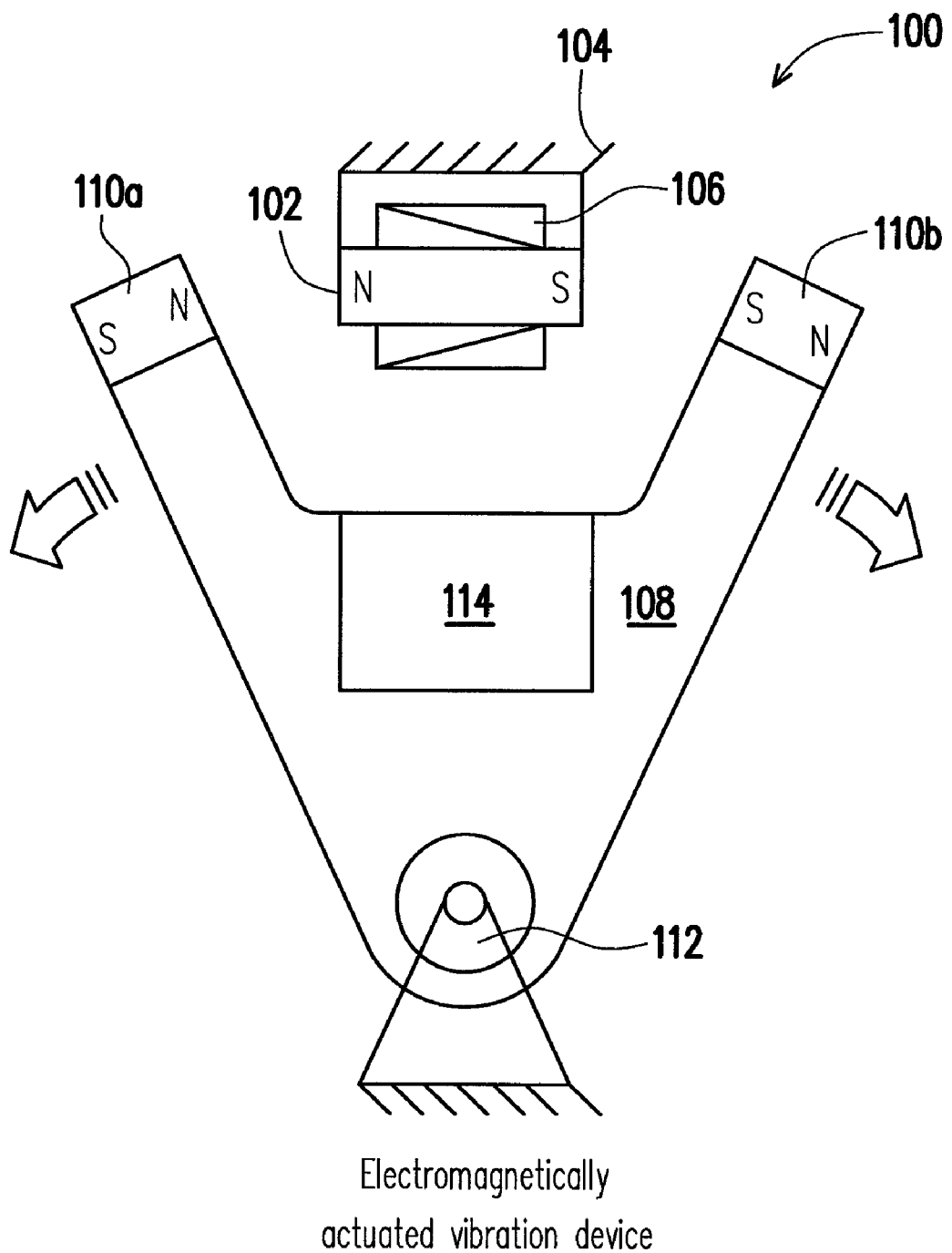
FIG. 1A illustrates a conventional vibrotactile haptic feedback device.
Figure 1B:
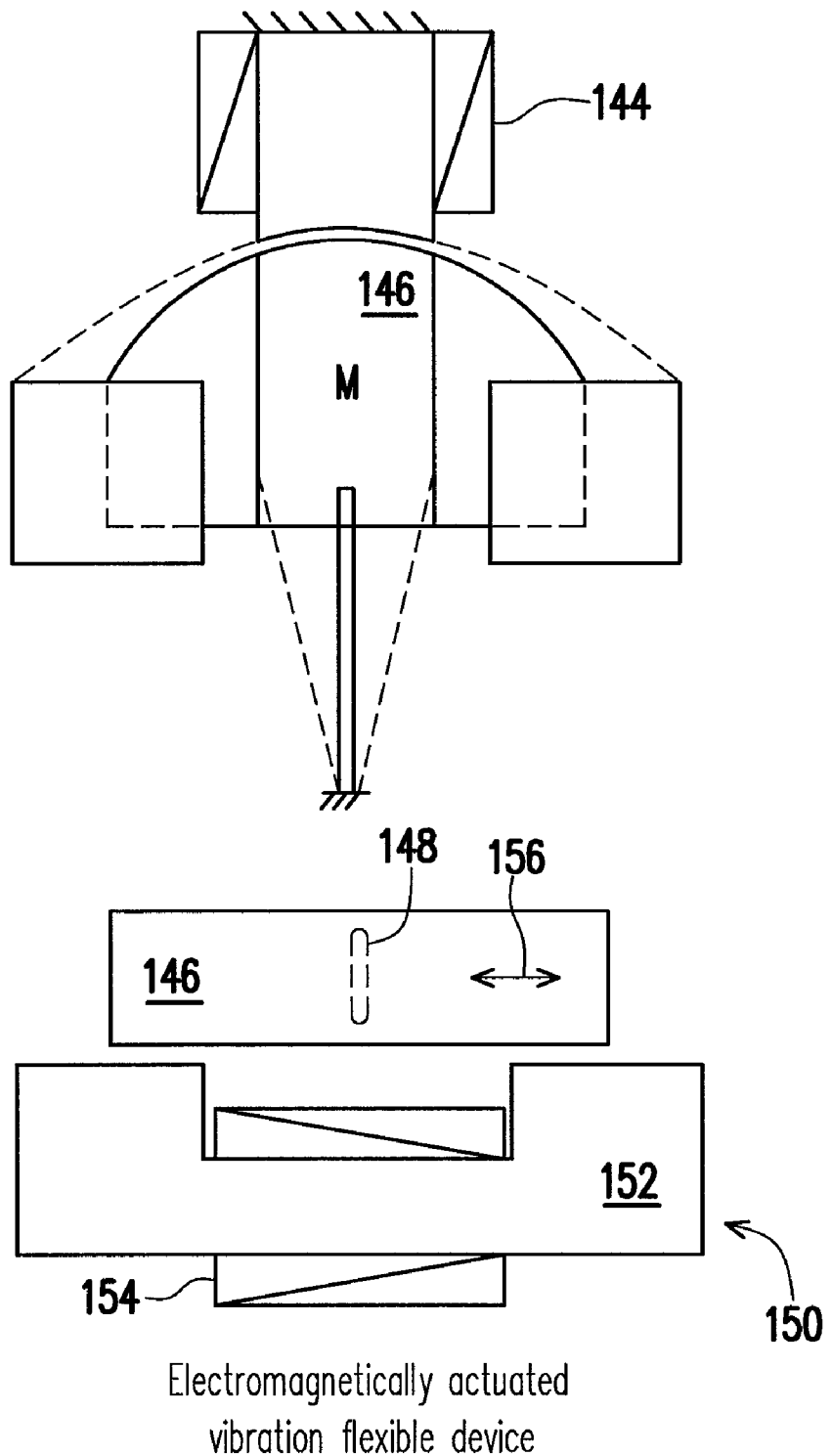
FIG. 1B illustrates a conventional electromagnetically actuated vibration system.
Figure 2A:
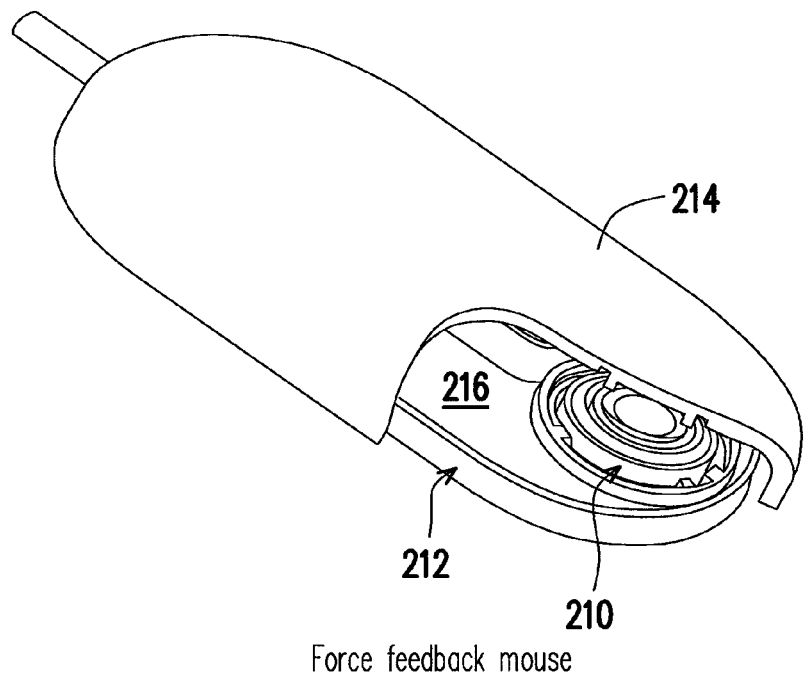
FIG. 2A illustrates a conventional force feedback device.
Figure 2B:
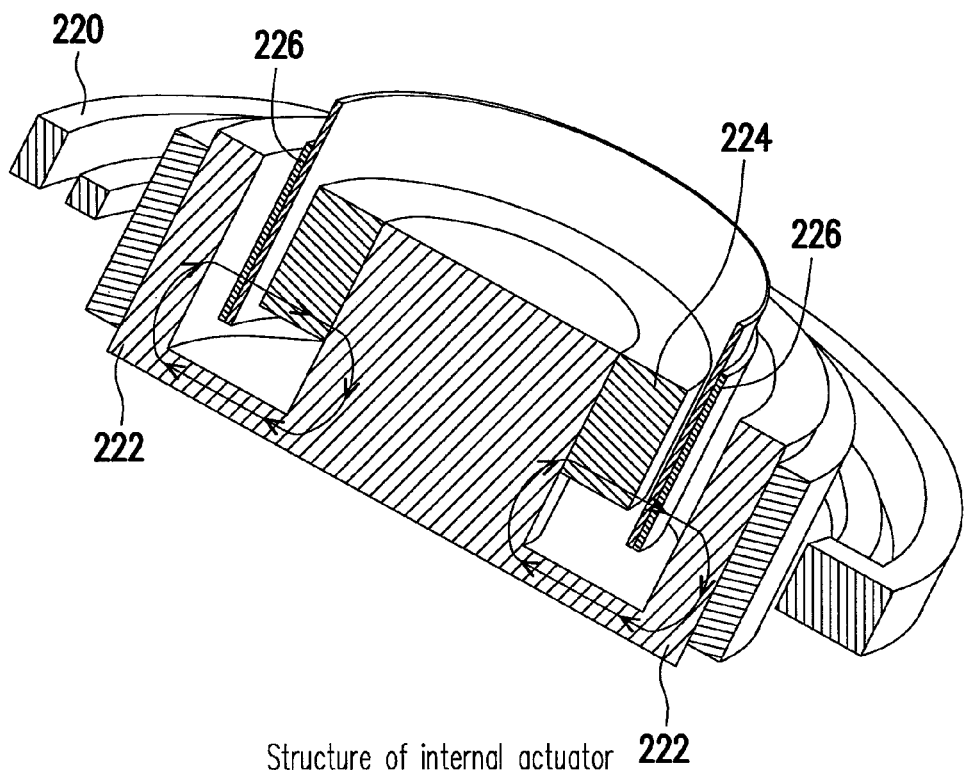
FIG. 2B and FIG. 2C are diagrams illustrating the composition and operation of an actuator assembly in the force feedback device in FIG. 2A.
Figure 2C:
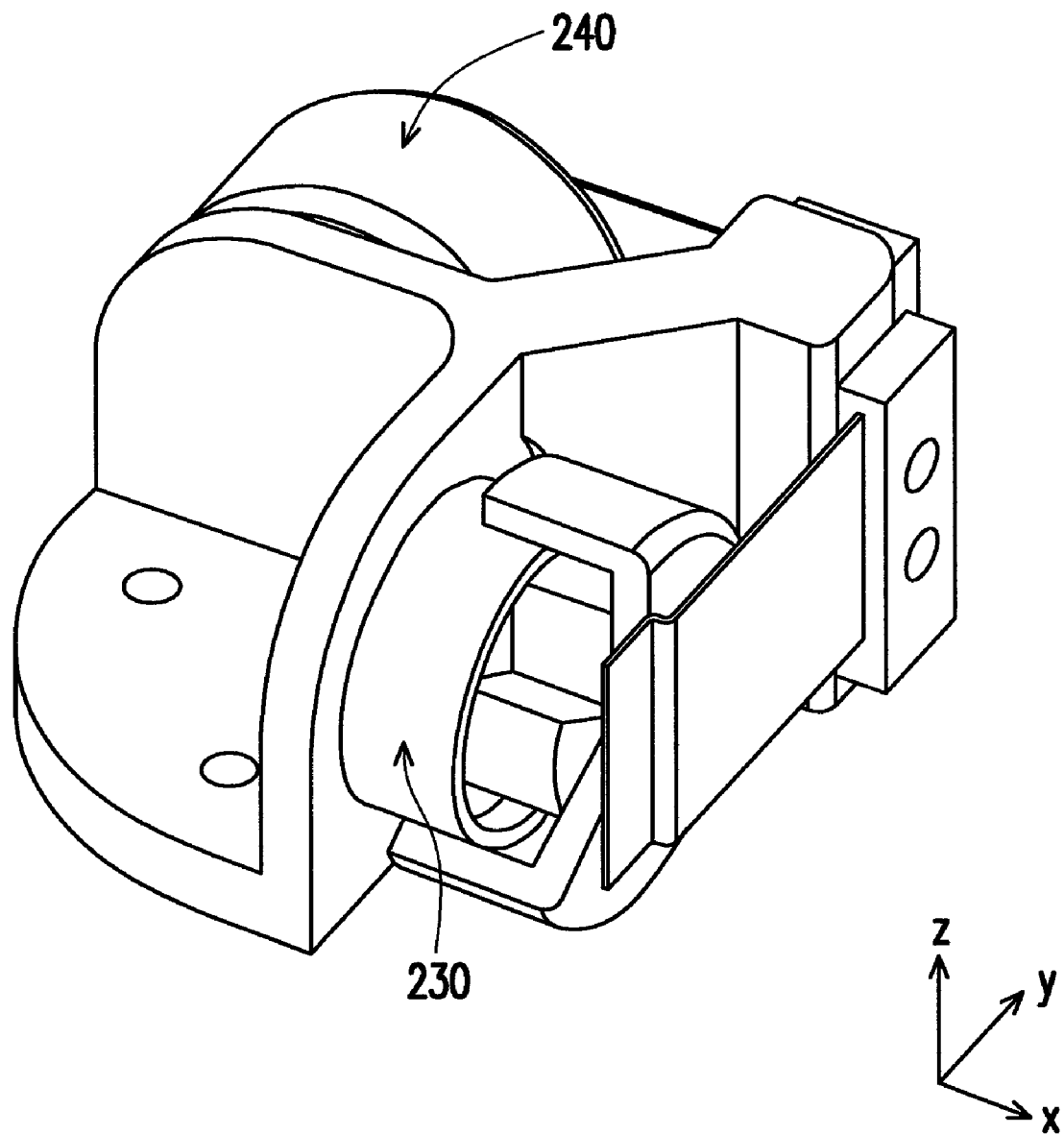
Figure 3A:
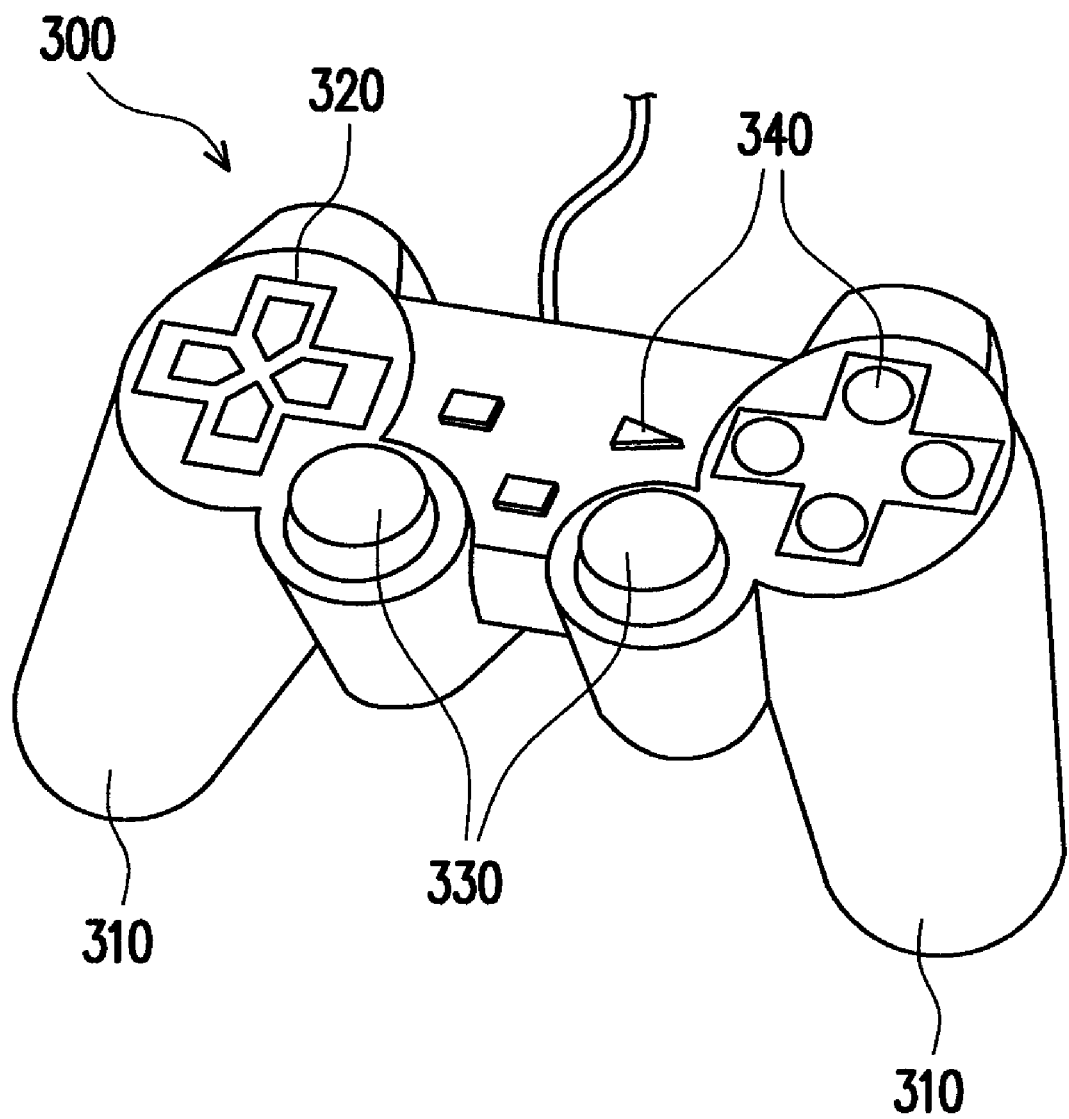
FIG. 3A illustrates a conventional force feedback device which produces a directional oscillatory vibration through a centrifugal force.
Figure 3B:
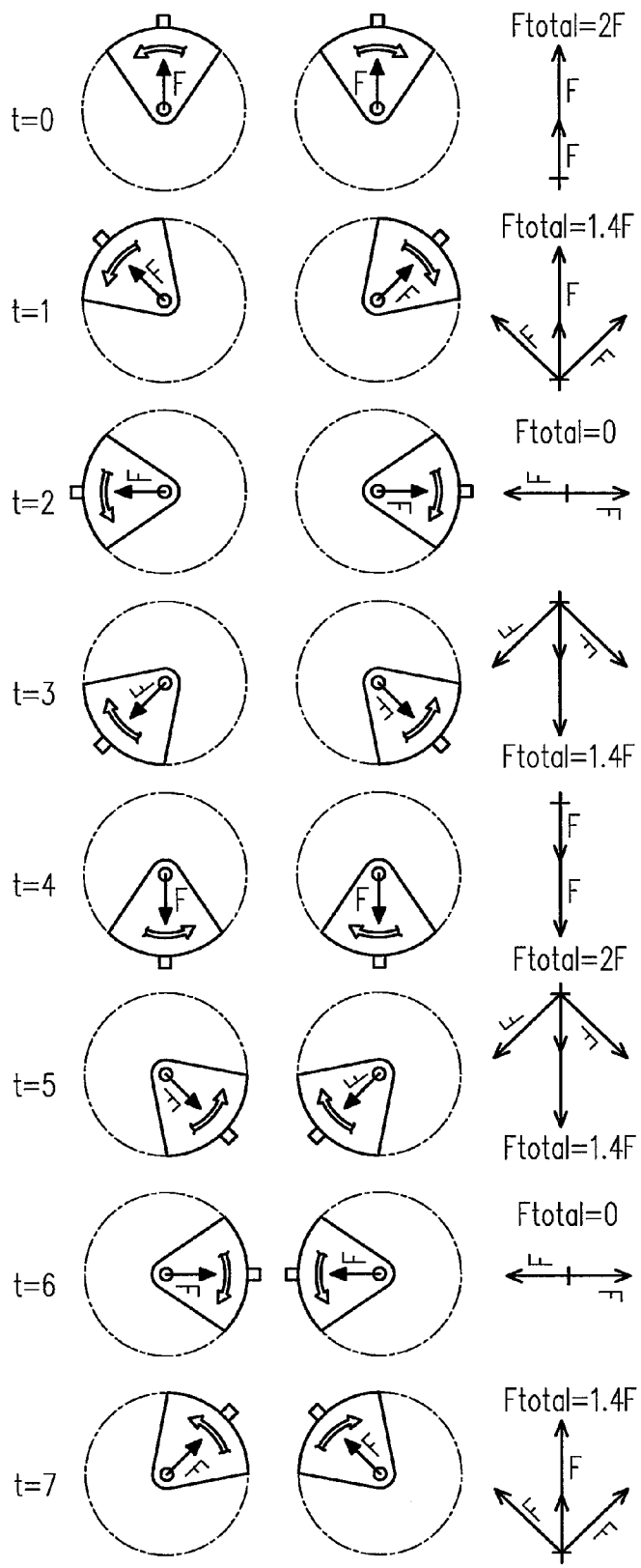
FIG. 3B is a diagram illustrating the operation principle of an actuator assembly in the force feedback device in FIG. 3A.

Reference will now be made in detail to the present preferred embodiments of the disclosure, examples of which are illustrated in the accompanying drawings. Wherever possible, the same reference numbers are used in the drawings and the description to refer to the same or like parts.

The disclosure provides an impact force feedback device. The impact force feedback device is applicable to various handheld devices (for example, cell phones, joysticks, and movement simulation devices, etc) for simulating force feedback of a handheld object in a virtual environment when impact or contact event occurs. The impact force feedback device needs not to be fastened to any platform and the size thereof can be minimized. Accordingly, both the portability and convenience of the impact force feedback device are improved.

Compared to the monotonous oscillatory force feedback, the impact force generated by the impact force feedback device in the disclosure is much greater. Thus, the impact force feedback device in the disclosure can be applied to an interactive operation system for simulating different impact scenarios, such as the ball hitting scenario in a golf training system or the recoil of a weapon in a shooting game, for example. The impact force feedback device in the disclosure can bring a real tactile sensation to the user by providing different force variations.

The disclosure provides an impact force feedback device. The impact force feedback device provides a force feedback on the contact area between the device and an object on which the device is attached. The impact force generated by the impact force feedback device can be applied to simulating different impact scenarios, such as the ball hitting scenario in a golf training system or the recoil of a weapon in a shooting game, and the impact force does not have to be a vibration or an oscillatory force. The impact force feedback device does not need to be placed or fastened to a platform; instead, it can be operated in a free space to provide a more complicated force feedback scenario. The impact force feedback device can bring a real tactile sensation to the user by providing different force variations.

Figure 4A:
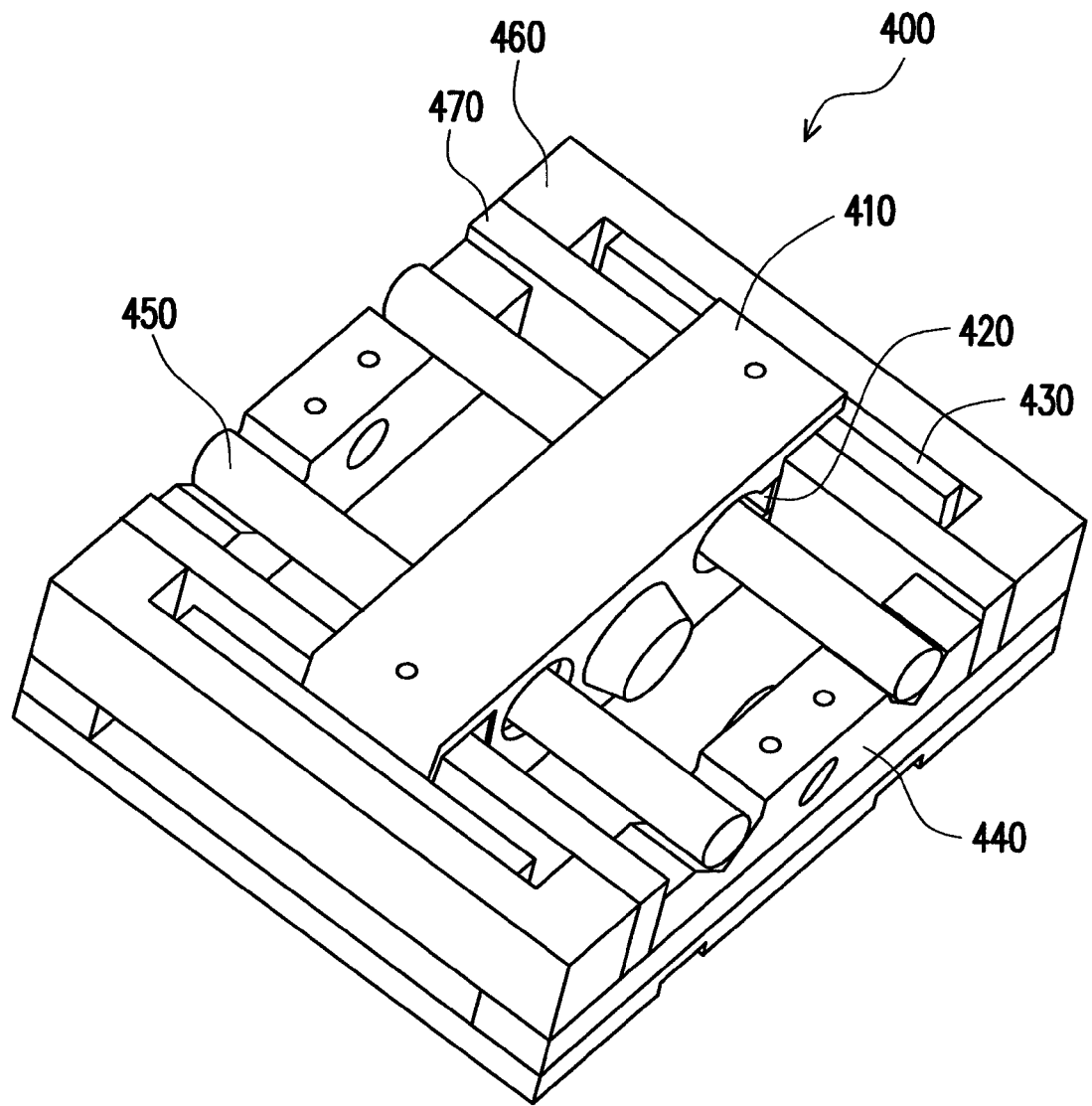
FIG. 4A is a side perspective view of an impact force feedback device according to an embodiment of the present disclosure.
Figure 4B:
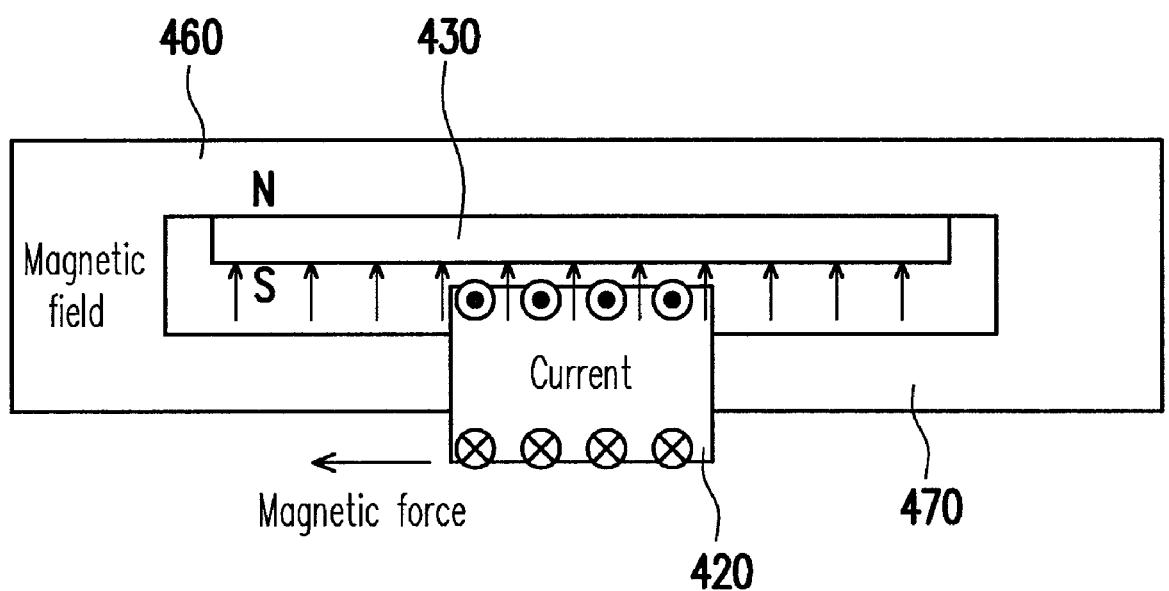
FIG. 4B is a partial cross-sectional view illustrating the operation of an actuator assembly.

FIG. 4A is a side perspective view of an impact force feedback device according to an embodiment of the disclosure, and FIG. 4B is a partial cross-sectional view illustrating the operation of an actuator assembly. Referring to FIG. 4A, the impact force feedback device 400 includes a mass 410, a coil 420, a magnet 430, a housing 440, a guide rod device 450, and yokes 460 and 470.

The housing 440 carries the actuator assembly. The shape of the housing 440 is not limited to the rectangular shape but can be in any shape. The housing 440 contains at least one actuator assembly for generating a desired impact force. The housing 440 may be made of a magneto-conductive material, such as ferro-carbon materials (for example, low carbon steel, medium carbon steel, or high carbon steel, in which the low carbon steel contains less carbon therefore has higher magneto-conductivity). The guide rod device 450 may be composed of one or multiple column-shaped guide rods. However, the guide rod device 450 may have any structure which can act as a guiding rail, such as a roller rail or a ball rail. The guide rod device 450 reduces the friction force generated by the mass 410 and the guide rod device 450. A roller (or any other device which can reduce friction force) may be further disposed on the mass 410 to reduce the contact area between the mass 410 and the guide rod device 450.

FIG. 4A also illustrates an embodiment of a structure of an actuator assembly. The actuator assembly includes the mass 410, the coil 420, and the guide rod device 450. According to the disclosure, the impact force feedback device may also include a plurality of actuator assemblies, and these actuator assemblies may be disposed at different angles to generate impact forces in different directions. In the actuator assembly, the mass 410 impacts the housing 440 to generate an impact force, and the mass 410 is designed to achieve the maximum impact force. The guide rod device 450 guides and supports the mass 410. The guide rod device 450 may be more than one guide rods or other guiding structures (for example, ball rails); however, the scope of the guide rod device 450 is not limited herein.

The mass 410 is disposed on the guide rod device 450 in a sliding manner. In an embodiment of the disclosure, at least one friction force reducing device is disposed between the mass 410 and the guide rod device 450 to reduce the friction force generated by the mass 410 and the guide rod device 450. The friction force reducing device may be a roller such that the contact area between the mass 410 and the guide rod device 450, and accordingly the friction force generated by the two, can be reduced.

The yokes 460 and 470 are attached to the housing 440. The yokes 460 and 470 are made of a magneto-conductive material, so as to form a loop of magnetic line of force. The magnet 430 is attached to the yoke 460 so that the magnet 430 and the yokes 460 and 470 form a magnetic field loop. The coil 420 is wrapped in the mass 410. An electric field orthogonal to the magnetic field can be generated by conducting a current through the coil 420, so that an electromagnetic force can be generated for driving the mass 410.

FIG. 4B is a diagram illustrating the operation of an actuator assembly in an impact force feedback device according to an embodiment of the disclosure. An electromagnetic force is generated when an electric field is produced in a direction orthogonal to the magnetic field by conducting a current through the coil 420, where the direction of the electromagnetic force conforms to the Fleming's left hand rule. Referring to FIG. 4B, the magnet 430 and the yokes 460 and 470 form a loop of magnetic line of force. The magnitude of the electric field can be changed by adjusting the current conducted through the coil 420, and the magnitude of the electromagnetic force can be affected by the change of the magnitude of the electric field. As a result, tactile sensations of different strengths can be produced. Namely, the actuator assembly can provide a large unidirectional force feedback sensation.

Figures 5A, 5B:
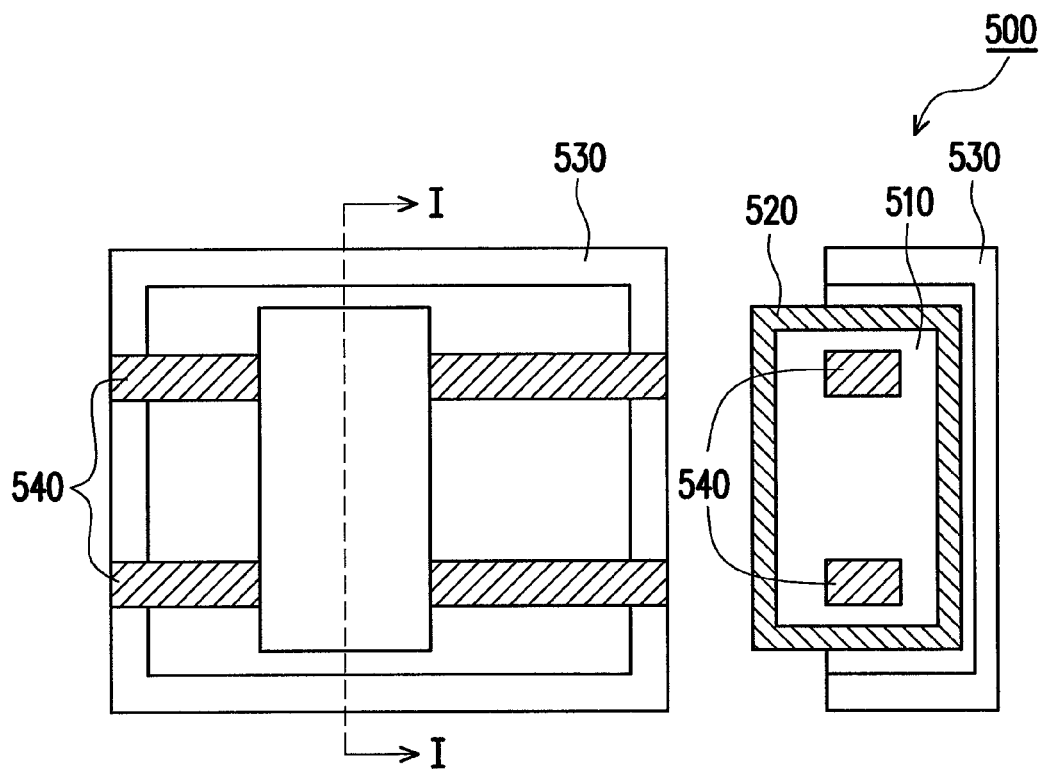
Figure 5C:
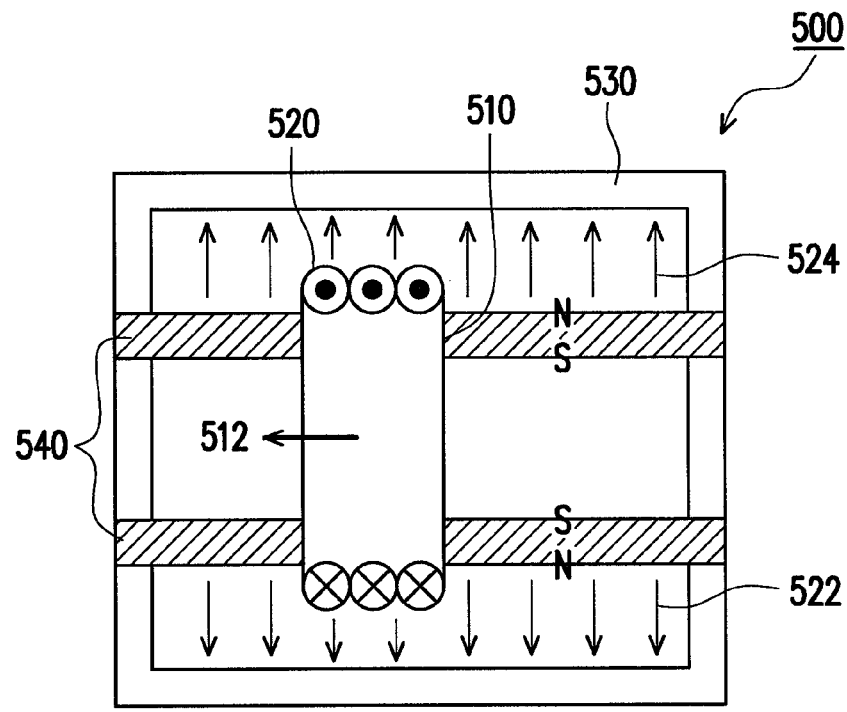

FIGS. 5A~5C are diagrams of an impact force feedback device according to another embodiment of the disclosure, wherein FIG. 5A is a top view of the impact force feedback device, FIG. 5B is a cross-sectional view of the impact force feedback device along line I-I in FIG. 5A, and FIG. 5C is a diagram illustrating the force received by the impact force feedback device.

Referring to FIGS. 5A~5C, the impact force feedback device 500 includes a mass 510, a coil 520, a housing 530, and a guide rod device 540 having a magnet.

The housing 530 carries an actuator assembly, and which may be of any shape other than the rectangular shape. The housing 530 contains at least one actuator assembly for generating a desired impact force. In the embodiment, the actuator assembly is composed of the mass 510, the coil 520, and the guide rod device 540 having the magnet.

FIG. 5C illustrates the structure of the actuator assembly. The mass 510 impacts the housing 530 to generate an impact force, and which is designed to achieve the maximum impact force. For example, the mass of the mass 510 is determined according to the variation of the electromagnetic force when the current of different magnitude is conducted through the coil 520 and the strength of impact force to be generated when the mass 510 is accelerated on the guide rod device 540.

The coil 520 is wrapped around the surface of the mass 510. By conducting a current through the coil 520, an electric field is produced in a direction orthogonal to the magnetic field, and accordingly an electromagnetic force is generated, and the electromagnetic force drives the mass 510 to move on the guide rod device 540. The guide rod device 540 guides and supports the mass 510. Referring to FIG. 5C, the magnetic field is disposed in such a direction (the polarities of two guiding rails in the guide rod device 540 and the positions of south and north poles) so that the coil 520 conducted with the current can generate an electromagnetic force in a direction as indicated by symbol 512.

As shown in FIG. 5A~5C, the electromagnetic force is generated by using the coil 520 wrapped around the surface of the mass 510 and the guide rod device 540 having the magnet. Accordingly, the magnitude of the electromagnetic force can be changed by adjusting the current conducted through the coil 520, and the acceleration of the mass 510 can be affected by the change in the magnitude of the electromagnetic force. As a result, tactile sensations of different impact force strengths can be provided. Namely, the actuator assembly can provide a large unidirectional impact force feedback sensation.

Figure 6:
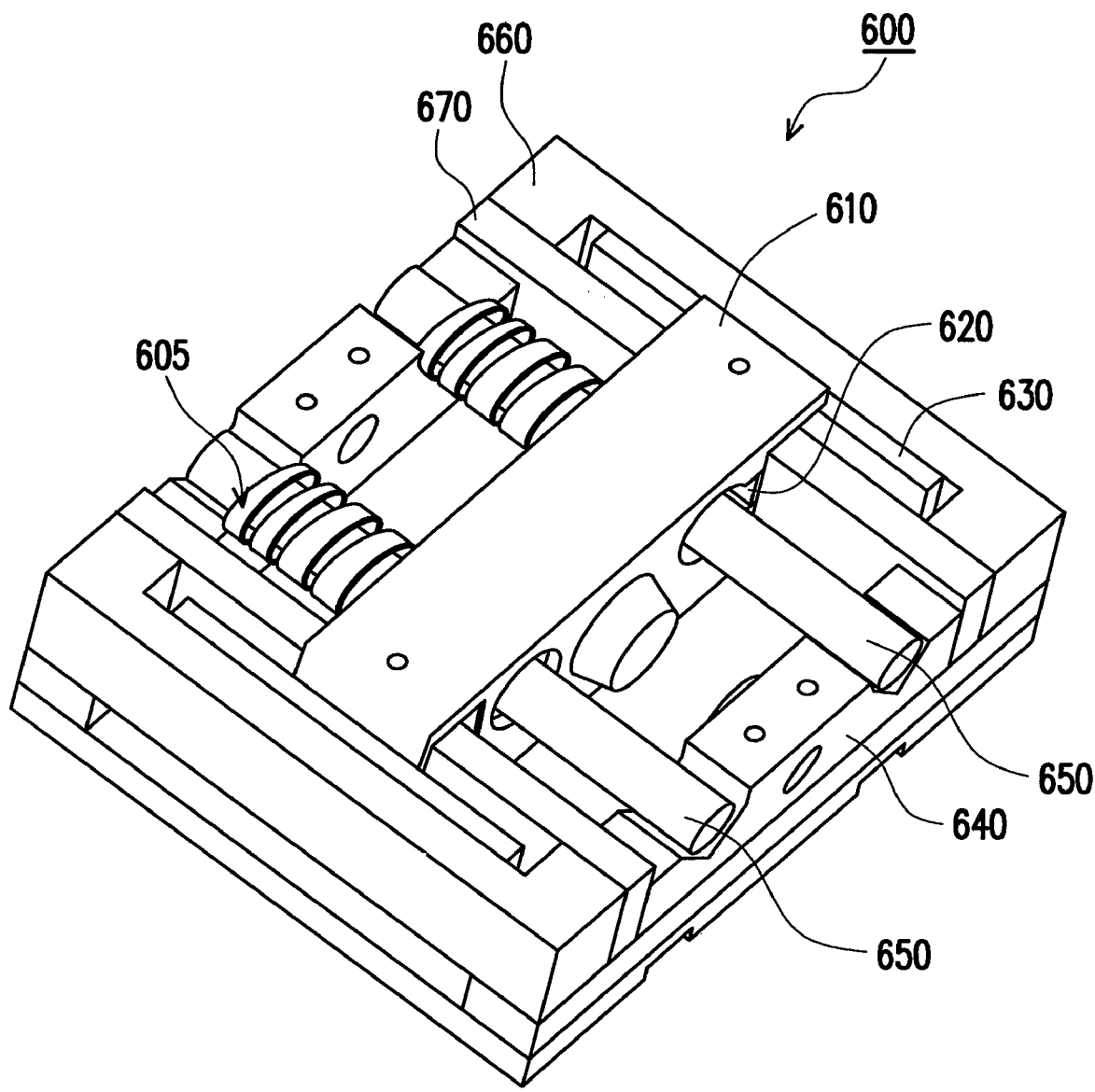
FIG. 6 is a side perspective view of an impact force feedback device according to yet another embodiment of the present disclosure.

FIG. 6 is a side perspective view of an impact force feedback device according to yet another embodiment of the disclosure. The impact force feedback device 600 includes a mass 610, a coil 620 (the cross-sectional structure thereof can be referred to FIG. 4B), a magnet 630, a housing 640, a guide rod device 650, and yokes 660 and 670. The embodiment is similar to the embodiment illustrated in FIG. 4A, and the difference between the two is that in the embodiment, an energy storage device is disposed in the actuator assembly (as shown in FIG. 6) in order to enhance the impact force. A flexible energy storage device 605 is disposed between the housing 640 and the mass 610. In an embodiment of the disclosure, the flexible energy storage device 605 may be a spring. Below, the flexible energy storage device 605 will be described by taking a spring as an example.

Based on the potential energy storage characteristic of the spring 605, an electromagnetic force in the reverse direction is first supplied to the spring 605 to fully compress the spring 605. When the mass 610 impacts the housing 640, the acceleration of the mass 610 can be effectively increased through the energy stored in the spring 605 and a positive electromagnetic force supplied to the mass 610. As a result, a larger impact force can be generated and a greater impact force feedback effect can be achieved.

Figure 7:
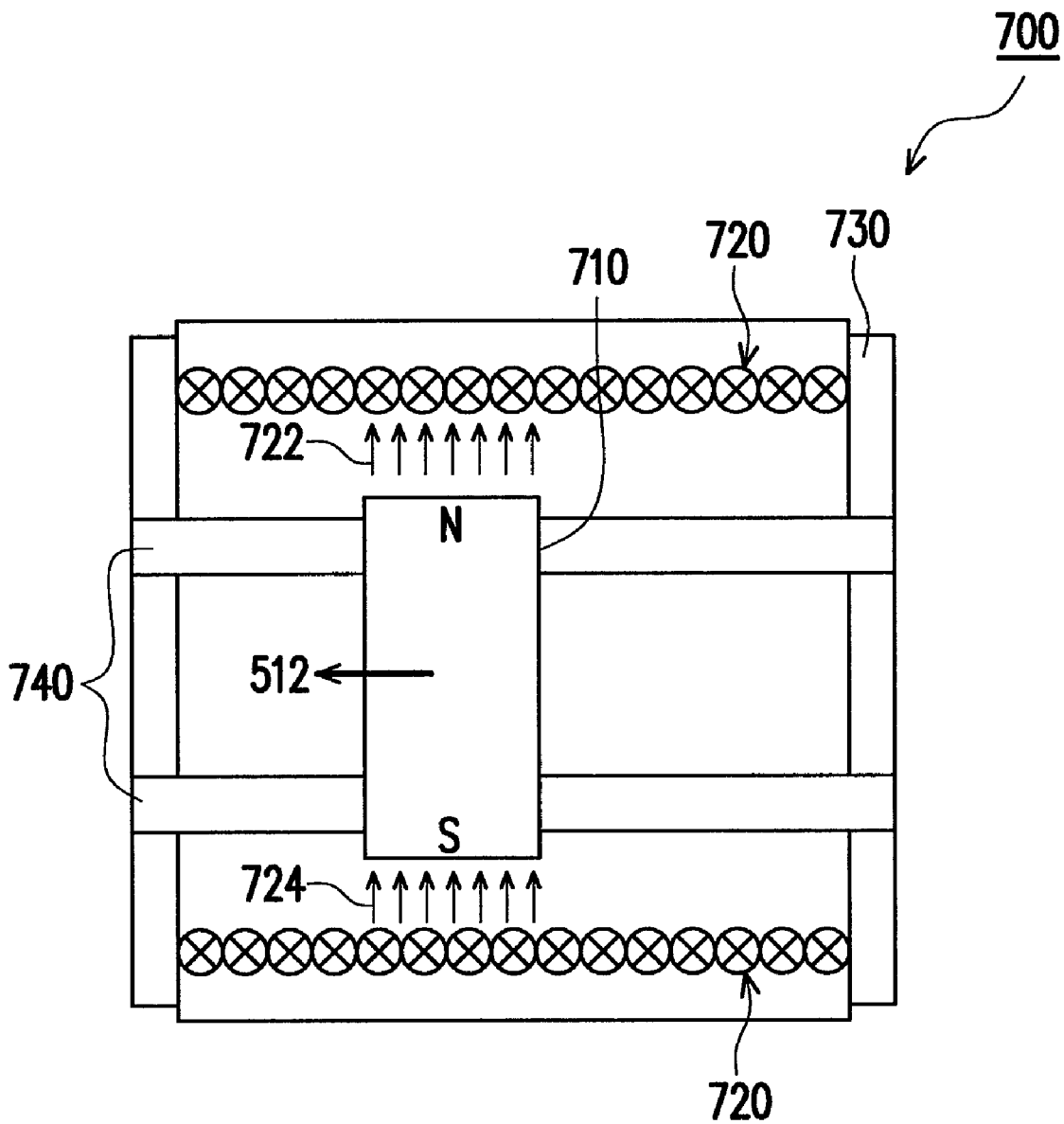
FIG. 7 is a cross-sectional view of an impact force feedback device according to still another embodiment of the present disclosure.

FIG. 7 is a cross-sectional view of an impact force feedback device according to still another embodiment of the disclosure. Referring to FIG. 7, the impact force feedback device 700 includes a mass 710 having a magnetic field, a coil 720, a housing 730, and a guide rod device 740.

The housing 730 carries an actuator assembly. The housing 730 may be in any shape other than the rectangular shape. The housing 730 contains at least one actuator assembly for generating a desired impact force. In the present embodiment, the actuator assembly is composed of the mass 710 having the magnetic field, the coil 720, and the guide rod device 740. The mass 710 may also be composed of magnets. In the present embodiment, the coil 720 is wrapped in a space within the housing 730 for containing the mass 710 and the guide rod device 740 and surrounds both sides of the guide rod device 740. By conducting a current through the coil 720, an electric field orthogonal to the magnetic field is produced, and accordingly an electromagnetic force is generated for driving the mass 710 to move on the guide rod device 740, as the magnetic force lines 722 and 724 in FIG. 7. The magnitude of the electromagnetic force can be changed by adjusting the current conducted through the coil 720, and the magnitude change of the electromagnetic force further causes change in the acceleration of the mass 710. As a result, tactile sensations of different force strengths can be produced. Namely, the actuator assembly can provide a large unidirectional force feedback sensation.

Figure 8:
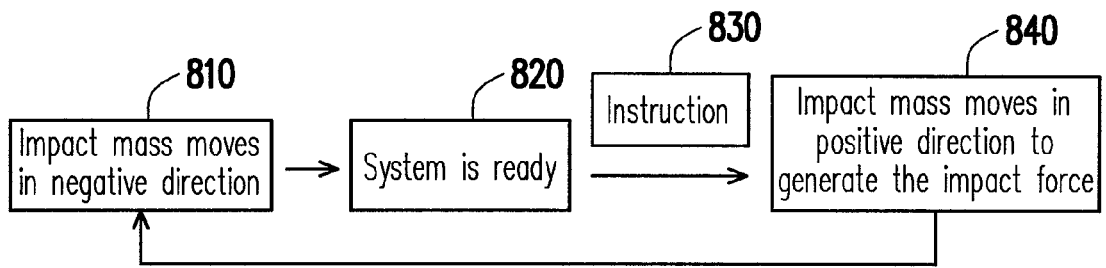
FIG. 8 and FIG. 9 illustrate an interactive system using an impact force feedback device provided by the present disclosure.

FIG. 8 illustrates an interactive system using an impact force feedback device provided by an embodiment of the disclosure. The interactive system includes a control unit and a force feedback device. In this interactive system, first, in step 810, an impact mass (i.e., the mass mentioned above) in the impact force feedback device is first moved toward a negative direction (opposite to the moving direction of the mass when an electromagnetic force is supplied to the mass). Then, in step 820, a "system is ready" message is issued. Next, in step 830, the control unit receives an impact instruction, and in step 840, the control unit supplies an electromagnetic force to the impact block in a positive direction to generate an impact force, so as to bring an interactive impact force feedback to the user. The impact force generated by the interactive system can be applied to simulating different impact scenarios, such as the ball hitting scenario in a golf training system or the recoil of a weapon in a shooting game, for example. The impact force does not have to be generated by a vibration or an oscillatory force architecture. The impact force feedback device does not need to be placed or fastened to a platform; instead, it can be operated in a free space to provide a more complicated force feedback scenario. The impact force feedback device can bring a real tactile sensation to the user by providing different force variations.

Figure 9:
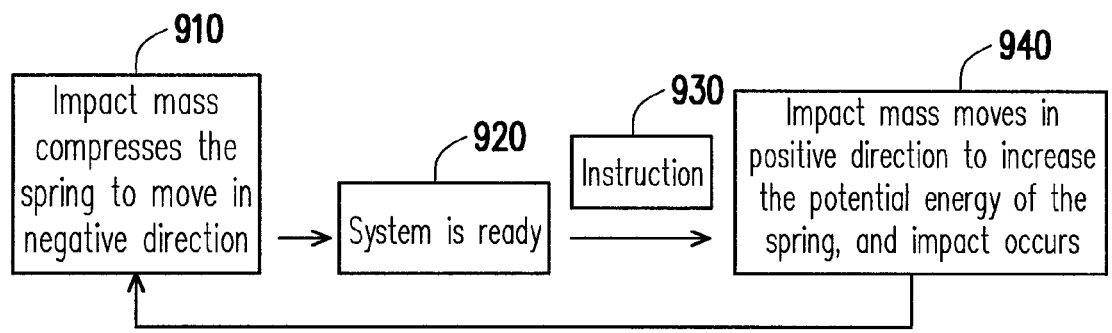

FIG. 9 illustrates an interactive system using an impact force feedback device according to another embodiment of the disclosure. In this interactive system, first, in step 910, an impact mass (i.e., the mass mentioned above) in the impact force feedback device is moved toward a negative direction (opposite to the moving direction of the mass when an electromagnetic force is supplied to the mass). However, in the embodiment, an energy storage device is further applied in the system in order to increase the impact force, which will be described in the embodiment by taking a spring as an example. Based on the potential energy storage characteristic of the spring, an electromagnetic force in the reverse direction is first supplied to the spring to fully compress the spring.

Thereafter, in step 920, a "system is ready" message is issued. Next, in step 930, the interactive system receives an impact instruction, and in step 940, the interactive system supplies an electromagnetic force to the impact mass in a positive direction, so as to generate an impact force and bring an interactive impact scenario to the user. When the impact mass starts to impact the housing, the acceleration of the impact mass can be effectively increased through the energy stored in the spring and a positive electromagnetic force supplied to the impact mass. As a result, a larger impact force can be generated and a greater impact force feedback effect can be achieved.

Figure 10:
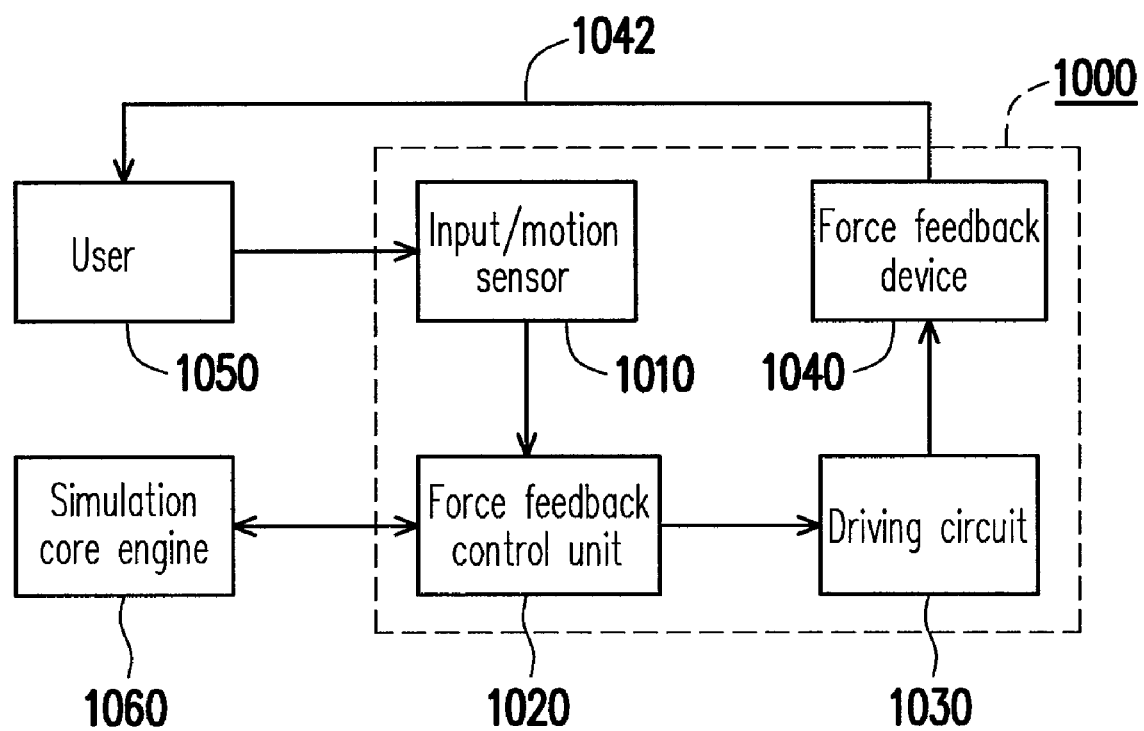
FIG. 10 is a block diagram of an interactive system using an impact force feedback device according to an embodiment of the present disclosure.

FIG. 10 is a block diagram of an interactive system using a force feedback device according to an embodiment of the disclosure. The interactive system 1000 includes an input and motion sensor 1010, a force feedback control unit 1020, a driving circuit 1030, and a force feedback device 1040. The input and motion sensor 1010 senses an input of a user 1050, where the input of the user 1050 may vary along with different design requirement, and which may be information of the attitude, motion, or input force of the user 1050. The interactive system 1000 is further connected to a simulation core engine 1060. The simulation core engine 1060 provides information of a virtual environment, such as spatial coordinates, physical characteristics of a virtual object, or the scenario mode of a force feedback, and the force feedback control unit 1020 calculates based on this information.

The force feedback control unit 1020 calculates according to the information provided by the simulation core engine 1060 and the information provided by the input/motion sensor 1010 for performing collision detection of an impact or contact event, force response calculation, and feedback force control.

The force feedback control unit 1020 receives a feedback signal from the input and motion sensor 1010 in real time and communicates with the simulation core engine 1060 to detect the occurrence of an impact event and calculate the desired force feedback to be output by the force feedback device 1040. Regarding the control of the strength of the feedback force generated by the force feedback device 1040, the force feedback control unit 1020 outputs a control instruction, and the control instruction is amplified by the driving circuit 1030 and then input into the force feedback device 1040, so as to output a corresponding feedback force to the user 1050.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:
1. A force feedback device, at least comprising:
a housing; and
a magnet, for generating a magnetic field; and
at least one actuator assembly, wherein the housing carries the actuator assembly, and the actuator assembly comprises:

a guide rod device, disposed on the housing;
a mass, disposed on the guide rod device in a sliding manner; and
a coil, disposed beside the magnet for generating an electromagnetic force when a current is conducted through the coil to generate an electric field, wherein the electromagnetic force is supplied to the mass such that the mass moves on the guide rod device and impacts the housing to generate an impact force feedback.

2. The force feedback device according to claim 1, wherein the housing is made of a magneto-conductive material.

3. The force feedback device according to claim 2, wherein the magneto-conductive material comprises carbon steels.

4. The force feedback device according to claim 1, wherein the magnet is disposed inside the housing for generating the magnetic field, the coil is wrapped around a surface of the mass, and the electromagnetic force is generated and supplied to the mass to accelerate the mass when the current is conducted through the coil.

5. The force feedback device according to claim 1, wherein the coil is disposed in a space within the housing for placing the guide rod device and the mass, the mass comprises the magnet to generate the magnetic field, and the electromagnetic force generated when the current is conducted through the coil is supplied to the mass to accelerate the mass.

6. The force feedback device according to claim 1, wherein the force feedback device comprises a plurality of actuator assemblies disposed at different angles to generate a multidimensional feedback force.

7. The force feedback device according to claim 1, wherein the mass is in a rectangular shape or a column shape.

8. The force feedback device according to claim 1, wherein the guide rod device is one or multiple column-shaped guide rods.

9. The force feedback device according to claim 1, wherein the guide rod device is one or multiple roller rails.

10. The force feedback device according to claim 1, wherein the guide rod device is one or multiple ball rails.

11. The force feedback device according to claim 1, wherein the mass is disposed on the guide rod device in a sliding manner, and at least one friction force reducing device is disposed between the mass and the guide rod device for reducing a friction force generated by the mass and the guide rod device.

12. The force feedback device according to claim 11, wherein the friction force reducing device is a roller for reducing a contact area between the mass and the guide rod device, so as to reduce the friction force.

13. The force feedback device according to claim 1, wherein the actuator assembly further comprises a flexible energy storage device located on the guide rod device, and the flexible energy storage device stores potential energy of the mass to generate a greater impact force when the mass impacts the housing.

14. The force feedback device according to claim 13, wherein a negative electromagnetic force is generated when the current is conducted through the coil within the magnetic field, before the mass impacts the housing, the negative electromagnetic force drives the mass to compress the flexible energy storage device and store the potential energy, when the mass starts to impact the housing, a direction of the current is changed to generate a positive electromagnetic force, and a greater acceleration is generated by using the potential energy stored in the flexible energy storage device for impacting the housing, so as to produce a unidirectional impact force feedback.

15. An interactive system, at least comprising:
a force feedback device, comprising a housing, a magnet, and at least one actuator assembly, wherein the housing carries the actuator assembly, the magnet generates a magnetic field, and the actuator assembly comprises:
a guide rod device, disposed on the housing;
a mass, disposed on the guide rod device in a sliding manner;
a coil, disposed beside the magnet; and
a control unit, for receiving a start-up command and conducting a current through the coil to generate an electric field, wherein an electromagnetic force is generated and supplied to the mass such that the mass moves on the guide rod device and impacts the housing to generate an impact force feedback.

16. The interactive system according to claim 15, wherein the magnet is disposed within the housing, the coil is wrapped around a surface of the mass, and the electromagnetic force is supplied to the mass to accelerate the mass.

17. The interactive system according to claim 15, wherein the coil is disposed in a space within the housing for placing the guide rod device and the mass, the mass comprises the magnet for generating the magnetic field, and the electromagnetic force generated when the current is conducted through the coil is supplied to the mass to accelerate the mass.

18. The interactive system according to claim 15, wherein the force feedback device comprises a plurality of actuator assemblies disposed at different angles to generate a multi-dimensional feedback force.

19. The interactive system according to claim 15, wherein the mass is disposed on the guide rod device in a sliding manner, and at least one friction force reducing device is disposed between the mass and the guide rod device for reducing a friction force generated by the mass and the guide rod device.

20. The interactive system according to claim 19, wherein the friction force reducing device is a roller for reducing a contact area between the mass and the guide rod device, so as to reduce the friction force.

21. The interactive system according to claim 15 further comprising a flexible energy storage device located on the guide rod device, wherein the flexible energy storage device stores potential energy of the mass to generate a greater impact force when the mass impacts the housing.

22. The interactive system according to claim 21, wherein after the control unit receives the start-up command, the control unit sequentially conducts a negative current and a positive current through the coil to generate electric fields in different directions, wherein when the control unit conducts the negative current through the coil, a negative electromagnetic force is generated, before the mass impacts the housing, the negative electromagnetic force drives the mass to compress the flexible energy storage device and store the potential energy, and when the mass starts to impact the housing, the control unit conducts the positive current through the coil to generate a positive electromagnetic force, and a greater acceleration is generated by using the potential energy stored in the flexible energy storage device for impacting the housing, so as to produce a unidirectional impact force feedback.

23. An interactive system, having the force feedback device in claim 1, the interactive system further comprising:
a sensor, for sensing a user input and outputting a sensing signal;
a force feedback control unit, for receiving the sensing signal and a virtual signal and generating a force feedback control signal; and a driving circuit, for receiving the force feedback control signal and driving the force feedback device to generate a feedback force corresponding to the user input.

24. The interactive system according to claim 23, wherein the force feedback control unit receives the sensing signal in real time to determine whether an impact or contact event occurs, so as to correct the force feedback control signal and adjust the feedback force.

25. The interactive system according to claim 24 further comprising a simulation core engine, wherein the force feedback control unit communicates with the simulation core engine regarding the sensing signal received in real time to confirm an occurrence of the impact or contact event and correct the virtual signal, so as to generate the corresponding force feedback control signal.

26. The interactive system according to claim 23, wherein the user input sensed by the sensor comprises one of an attitude, a motion, and an input force of a user.

27. The interactive system according to claim 23 further comprising a simulation core engine connected to the force feedback control unit, wherein the virtual signal is generated by the simulation core engine according to information of a virtual environment.

28. The interactive system according to claim 27, wherein the information of the virtual environment comprises spatial coordinates, physical characteristics of a virtual object, or a force feedback scenario mode.

* * * * *